US012749943B2

(12) United States Patent
McEneaney et al.

(10) Patent No.: US 12,749,943 B2
(45) Date of Patent: Sep. 29, 2026

(54) COOLING SYSTEM FOR AN ELECTRIC MACHINE

(71) Applicant: Caterpillar Inc., Peoria, IL (US)

(72) Inventors: Robert Thomas McEneaney, Crystal Lake, IL (US); Jeffrey Thomas Michielutti, Edina, MN (US)

(73) Assignee: Caterpillar Inc., Peoria, IL (US)

( * ) Notice: Subject to any disclaimer, the term of this patent is extended or adjusted under 35 U.S.C. 154(b) by 194 days.

(21) Appl. No.: 18/523,155

(22) Filed: Nov. 29, 2023

(65) Prior Publication Data

US 2025/0175054 A1 May 29, 2025

(51) Int. Cl.
*H02K 5/20* (2006.01)

(52) U.S. Cl.
CPC .................................... *H02K 5/207* (2021.01)

(58) Field of Classification Search
CPC ...................................................... H02K 5/207
See application file for complete search history.

(56) References Cited

U.S. PATENT DOCUMENTS 4,051,400 A * 9/1977 Armor ..................... H02K 9/00 310/58
6,188,153 B1 * 2/2001 Hokanson ................ H02K 9/00 310/58
8,167,585 B2 5/2012 Kreitzer et al.
8,207,642 B2 6/2012 Lafontaine et al.
8,288,901 B2 10/2012 Harb et al.
2008/0048511 A1 * 2/2008 Robin ....................... H02K 9/00 310/58
2010/0079946 A1 * 4/2010 Bharani ................ B60L 3/0061 165/104.34

FOREIGN PATENT DOCUMENTS

JP 2005168204 A 6/2005

* cited by examiner

*Primary Examiner* — Sean Gugger
(74) *Attorney, Agent, or Firm* — Harrity & Harrity LLP

(57) ABSTRACT

In some implementations, a cooling system for an electric machine may include an air inlet at a first end of the electric machine configured to provide an air flow through a housing of the electric machine. The cooling system may include one or more baffles removably coupled to a stator of the electric machine, the one or more baffles positioned proximate to a second end of the electric machine, and the one or more baffles being configured to direct the air flow toward one or more windings of the electric machine at the second end. The cooling system may include one or more openings in the housing of the electric machine proximate to the second end of the electric machine configured to enable the air flow to pass into or out of the housing.

20 Claims, 7 Drawing Sheets

COOLING SYSTEM FOR AN ELECTRIC MACHINE

TECHNICAL FIELD

The present disclosure relates generally to electric machines and, for example, to a cooling system for an electric machine.

BACKGROUND

An electric machine (e.g., an electric motor, a generator, or another electric machine) may include one or more windings and a stator. The stator includes one or more slots or cavities (e.g., teeth) that accommodate the windings. The stator is the stationary core of the electric machine, providing a stable foundation for the other components. The windings (also referred to as coils or winding assemblies) include conductive wires wound around the teeth of the stator. The windings are placed in the stator to create an electromagnetic field when electrical current is applied. In some examples, a rotor of the electric machine may also include one or more windings (e.g., armature windings). The windings included in the stator generate an electromagnetic field (e.g., when electrical current is applied) to cause the rotor to rotate (e.g., to produce a mechanical output).

During operation, the electric machine may generate heat. For example, the flow of electrical current through the windings results in the dissipation of electrical power in the form of heat. The electric machine may include a cooling system that causes fluid flow (e.g., air flow) to pass over components of the electric machine to cool the components, such as the windings. However, as the fluid flow passes through the electric machine, the fluid flow may be heated. As a result, components (e.g., windings) located closer to an outlet of the fluid flow may not be cooled at the same rate as components (e.g., windings) located closer to an inlet of the fluid flow. Such uneven cooling of the components may cause one or more problems. For example, the uneven cooling of windings may result in uneven wearing of the windings (e.g., the windings (or a portion of a winding) that is less cooled may wear faster). Further, uneven cooling can create hotspots within the windings. These hotspots can result in localized overheating, which can cause insulation breakdown and/or reduced winding life. Overheating caused by uneven cooling accelerates the aging of the windings. Premature aging can significantly reduce the expected lifespan of the electric machine, resulting in more frequent maintenance or the need for replacement (e.g., of windings and/or the entire electric machine). Further, the uneven cooling may result in the electric machine producing additional flow to adequately cool the windings and/or other components of the electric machine, thereby consuming power resources associated with producing the additional flow (e.g., via one or more fans or pumps).

U.S. Pat. No. 6,188,153 (the '153 patent) discloses a segmented stator end turn air deflector for a force ventilated alternating current (AC) motor which can be retrofitted into existing motors for redirecting air flowing through passages in a stator of the motor. In an exemplary form, a segmented stator end turn air deflector comprises a plurality of generally flat plates each having a trapezoidal shape with arcuate inner and outer edges for positioning within a cylindrical motor housing. The plates can be oriented perpendicular to the direction of air flow through the motor stator whereby air exiting the stator passages impinges on the plates and is directed radially inward of the motor and onto end turns of the motor coils or windings.

However, the plates disclosed by the '153 patent do not adequately direct the air in the motor because the plates are flat and do not efficiently direct the air flow toward components to be cooled. Additionally, the plates disclosed by the '153 patent may direct air that has already been heated, resulting in inefficient cooling of the windings.

The cooling system of the present disclosure solves one or more of the problems set forth above and/or other problems in the art.

SUMMARY

In some implementations, a cooling system for an electric machine includes an air inlet at a first end of the electric machine configured to provide an air flow through a housing of the electric machine; one or more baffles removably coupled to a stator of the electric machine, the one or more baffles positioned proximate to a second end of the electric machine, and the one or more baffles being configured to direct the air flow toward one or more windings of the electric machine at the second end; and one or more openings in the housing of the electric machine proximate to the second end of the electric machine configured to enable the air flow to pass into or out of the housing.

In some implementations, an electric machine includes a housing including an air inlet; a stator; one or more windings configured within the stator, the one or more windings from a first end of the electric machine to a second end of the electric machine, the first end being proximate to the air inlet; and one or more baffles extending away from the one or more windings and toward the first end.

In some implementations, a cooling system for an electric machine includes an air inlet at a first end of the electric machine configured to provide an air flow through a housing of the electric machine; and one or more baffles removably coupled to a stator of the electric machine, the one or more baffles positioned proximate to a second end of the electric machine, the one or more baffles extending away from the stator and angled toward the first end, and the one or more baffles being configured to direct the air flow toward one or more windings of the electric machine at the second end.

DETAILED DESCRIPTION

This disclosure relates to a cooling system, which is applicable to any electric machine. For example, the electric machine may be an electric motor, a generator, and/or a transformer, among other examples. In some examples, the electric machine may power an electrical propulsion system.

For example, the electric machine may be included in an electric drive traction system that provides driving forces to traction devices of a work machine. In some examples, the electric machine may be a switched reluctance motor or a traction motor.

Figure 1:
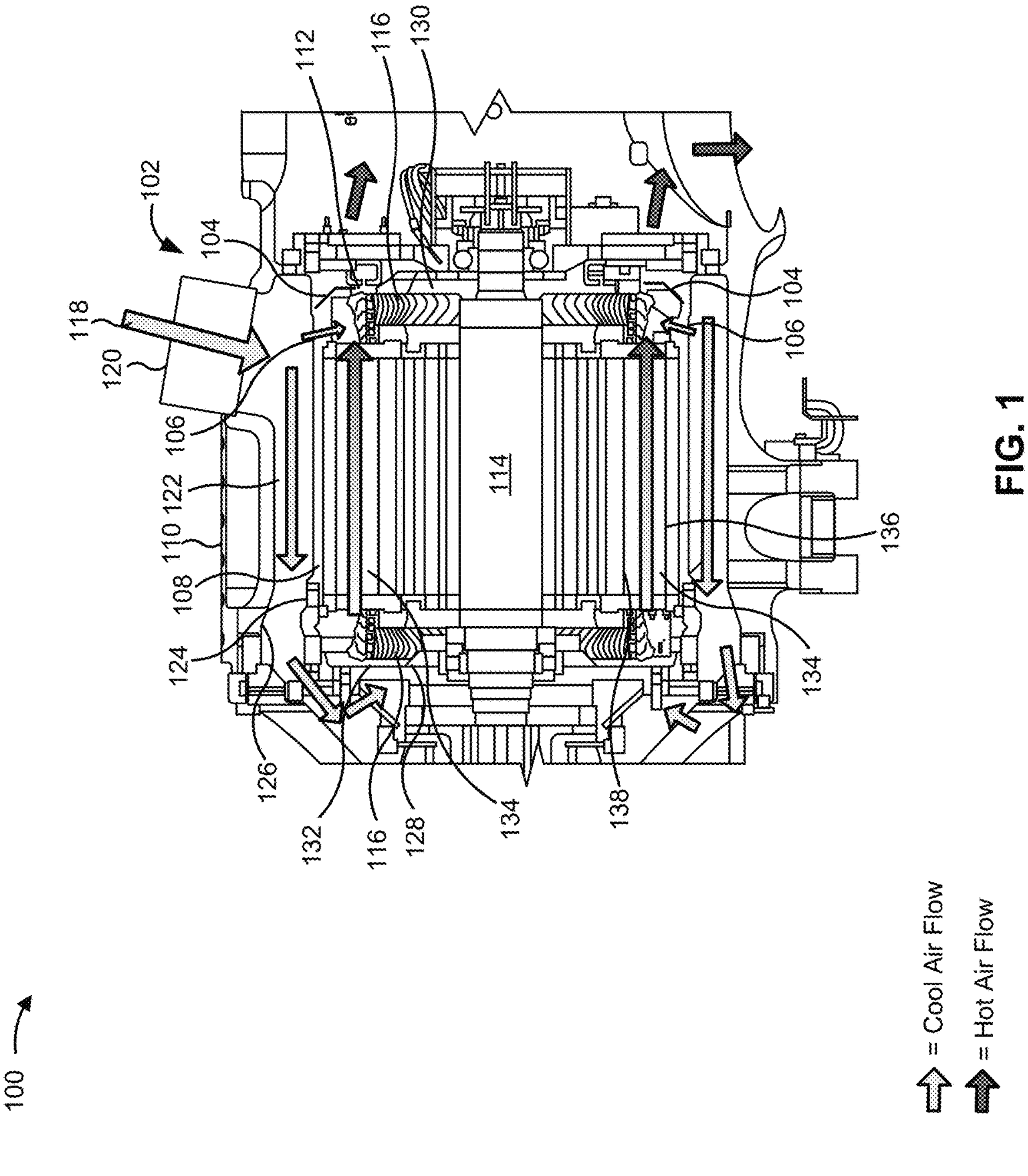
FIG. 1 is a cross-section view of an example electric machine.

FIG. 1 is a cross-section view of an example electric machine 100. The electric machine 100 may include a cooling system 102. As described in more detail elsewhere herein, the cooling system 102 may include one or more baffles 104 and/or one or more openings 106 in a housing 108 (also referred to as a casing) of the electric machine 100. In some examples, the cooling system may include one or more pumps, fans, and/or other components associated with causing an air flow (not shown in FIG. 1).

The electric machine 100 includes (or is included in) an outer housing 110. In some examples, the outer housing 110 may be an axle housing (e.g., of a work machine or vehicle). In other examples, the electric machine 100 may not include (or may not be included in) the outer housing 110. The electric machine 100 may include a stator 112 and a rotor 114 rotatably disposed therein. In some examples, an annular stator jacket surrounds and circumferentially engages an outer circumferential surface of the stator 112.

The stator 112 has a stator body with an inner circumferential surface facing the rotor 114. In some examples, a plurality of stator poles extend radially inward from the inner circumferential surface of the stator body. Each stator pole has a pair of oppositely facing side surfaces. The space between the facing side surfaces of adjacent stator poles defines stator slots into which windings 116 (also referred to as coils or conductive wires) are positioned. In other words, each stator pole has a winding 116 (or coil) wrapped therearound so that a portion of each coil is positioned in adjacent stator slots. The windings 116 are positioned about stator poles of each group of a phase set that are electrically connected as part of an electrical circuit, either in parallel or in series. The stator 112 may be formed by stacking a plurality of one-piece continuous annular iron members together. A layer of insulative material (not shown) may be provided between each iron member.

The rotor 114 has a rotor body with a plurality of rotor poles extending radially outward from the body. In a switched reluctance motor, the rotor 114 has no windings or magnets. In other examples, the rotor 114 may have one or more windings or magnets. The rotor 114 may be formed of a stack of laminated iron one-piece continuous annular members (not shown). Rotors 114 having other structures and configurations are contemplated. In addition, while the electric machine of FIG. 1 is depicted as an electric motor, the concepts disclosed herein are applicable to other rotary electric machines.

As shown in FIG. 1, the cooling system 102 is configured to provide a flow of fluid (e.g., air) through the electric machine 100 to cool one or more components of the electric machine 100, such as one or more windings 116. For example, an air flow 118 may pass through an inlet 120 in the outer housing 110. The air flow 118 may pass through a passageway 122 that is configured between an outer surface 124 of the housing 108 and an inner surface 126 of the outer housing 110. The cooling system 102 may be configured to cause the air flow 118 to pass into the housing 108 proximate to a first end 128. The first end 128 may be a first end of the housing 108, a first end of the one or more windings 116, or a first end of the rotor 114. The cooling system 102 is configured to cause the air flow to pass through the electric machine from the first end 128 to a second end 130 (e.g., where the air flow 118 exits the housing 108). The second end 130 may be a second end of the housing 108, a second end of the one or more windings 116, or a second end of the rotor 114. The housing 108 may include one or more air inlets 132 at the first end 128. The one or more air inlets 132 are configured to enable air flow 118 to pass into the housing 108.

As shown in FIG. 1, as the air flow passes from the first end 128 to the second end 130, the air flow may be heated (e.g., due to heat dissipated by one or more components of the electric machine 100, such as the one or more windings). Therefore, the first end 128 may be referred to as a "cool" end of the electric machine 100 and the second end 130 may be referred to as a "hot" end of the electric machine 100. The air flow 118 may pass through a passageway 134 included in the housing 108. The passageway 134 may be between an inner surface 136 of the housing 108 and an outer surface 138 of the stator 112.

The one or more baffles 104 are configured on the stator 112 proximate to (or at) the second end 130. For example, the one or more baffles 104 are removably attached to the stator 112. The one or more baffles 104 are configured to deflect or direct the air flow 118 toward one or more components of the electric machine 100 (e.g., the one or more windings 116) near the second end 130 (e.g., to improve the cooling of the one or more components of the electric machine 100 that may otherwise be cooled less than component(s) located near the first end 128). Additionally, the one or more openings 106 are configured to allow air flow to pass from the passageway 122 to an interior of the housing 108 near the second end 130. For example, as shown in FIG. 1, the cooling system 102 may include the one or more openings 106 to enable cool air to pass into the housing 108 near the second end 130 (e.g., to improve the cooling of the one or more components of the electric machine 100 that may otherwise be cooled less than component(s) located near the first end 128).

As indicated above, FIG. 1 is provided as an example. Other examples may differ from what is described with regard to FIG. 1.

Figure 2:
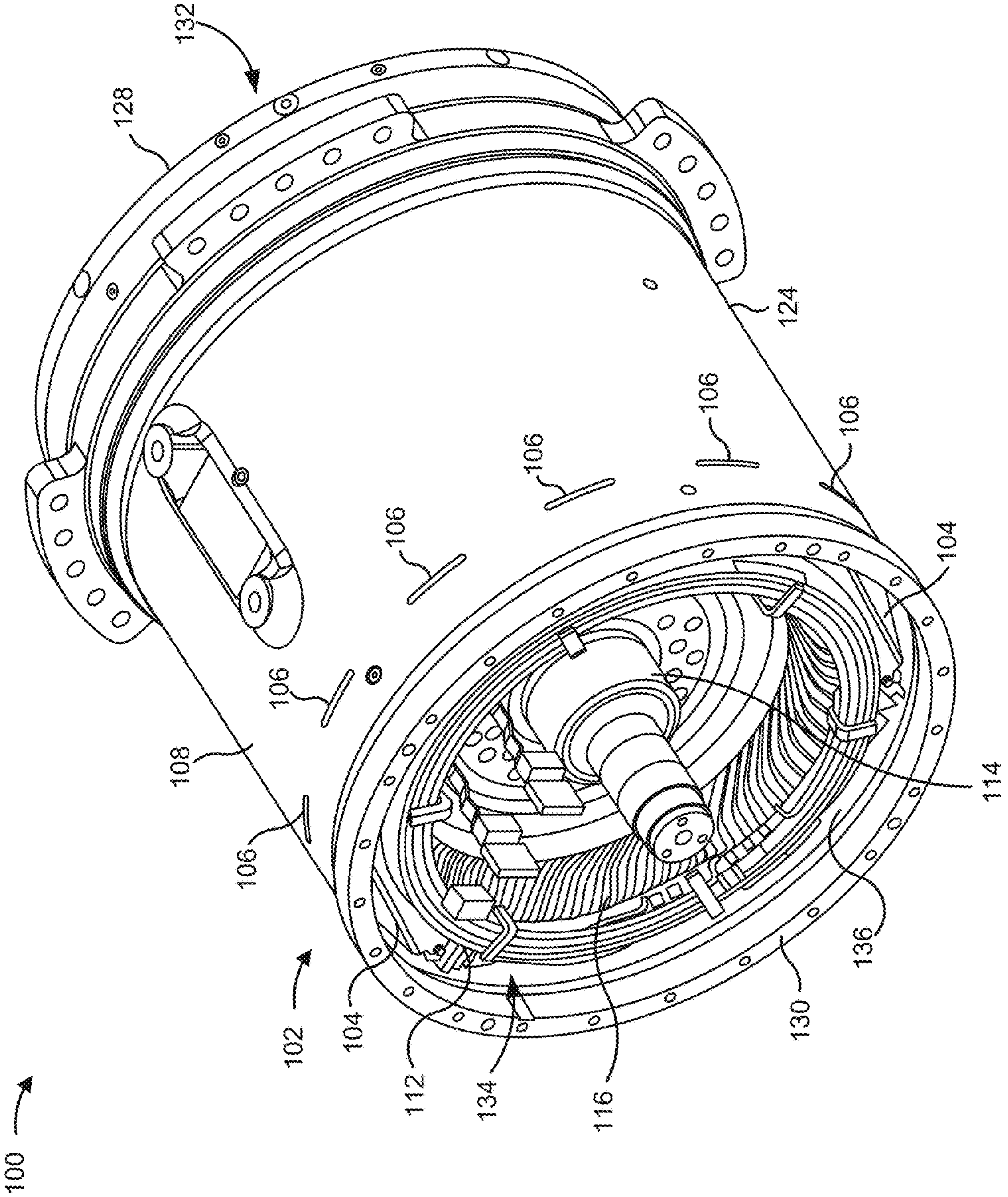
FIG. 2 is a perspective view of the example electric machine.

FIG. 2 is a perspective view of an example electric machine 100. The electric machine 100 depicted in FIG. 2 includes the cooling system 102.

The housing 108 has an annular configuration or shape. In other examples, the housing 108 may have a different configuration or shape. The one or more openings 106 are in the housing 108 of the electric machine 100 proximate to the second end 130. The one or more openings 106 are configured to enable the air flow (e.g., the air flow 118) to pass into and/or out of the housing 108 (e.g., near the second end 130). The one or more openings 106 are configured near an end of the housing 108 (e.g., near the second end 130) that is opposite to an end of the housing 108 that includes the one or more air inlets 132 for the cooling system 102 (e.g., opposite to the first end 128). The one or more openings 106 may be referred to as holes, ports, and/or apertures, among other examples. The one or more openings 106 may create an opening from the outer surface 124 of the housing 108 to the inner surface 136 of the housing 108.

In some examples, the one or more openings 106 are multiple openings that are spaced around a periphery of the housing 108. For example, the one or more openings 106 are spaced around an outer circumference of the housing 108. For example, the one or more openings 106 are circumferentially spaced about the body of the housing 108. In some examples, the one or more openings are multiple openings that are equally spaced around the periphery of the housing 108 (e.g., equally or evenly spaced around the circumference of the housing 108). The one or more openings 106 are each placed an equal distance from the second end 130 and/or from the first end 128. The one or more openings 106 are placed proximate to the second end 130. For example, the one or more openings 106 are placed closer to the second end 130 than the first end 128.

A position of the one or more openings 106 may be based at least in part on a position of the one or more baffles 104. For example, the one or more openings 106 may be positioned near the position of the one or more baffles 104 (e.g., relative to the second end 130). In some examples, the one or more baffles 104 are configured behind the one or more openings 106 relative to the first end 128 (e.g., to enable air flow, such as the air flow 118, to be cooled by air entering the housing 108 via the one or more openings 106 prior to being deflected or directed by the one or more baffles 104).

As indicated above, FIG. 2 is provided as an example. Other examples may differ from what is described with regard to FIG. 2.

Figure 3:
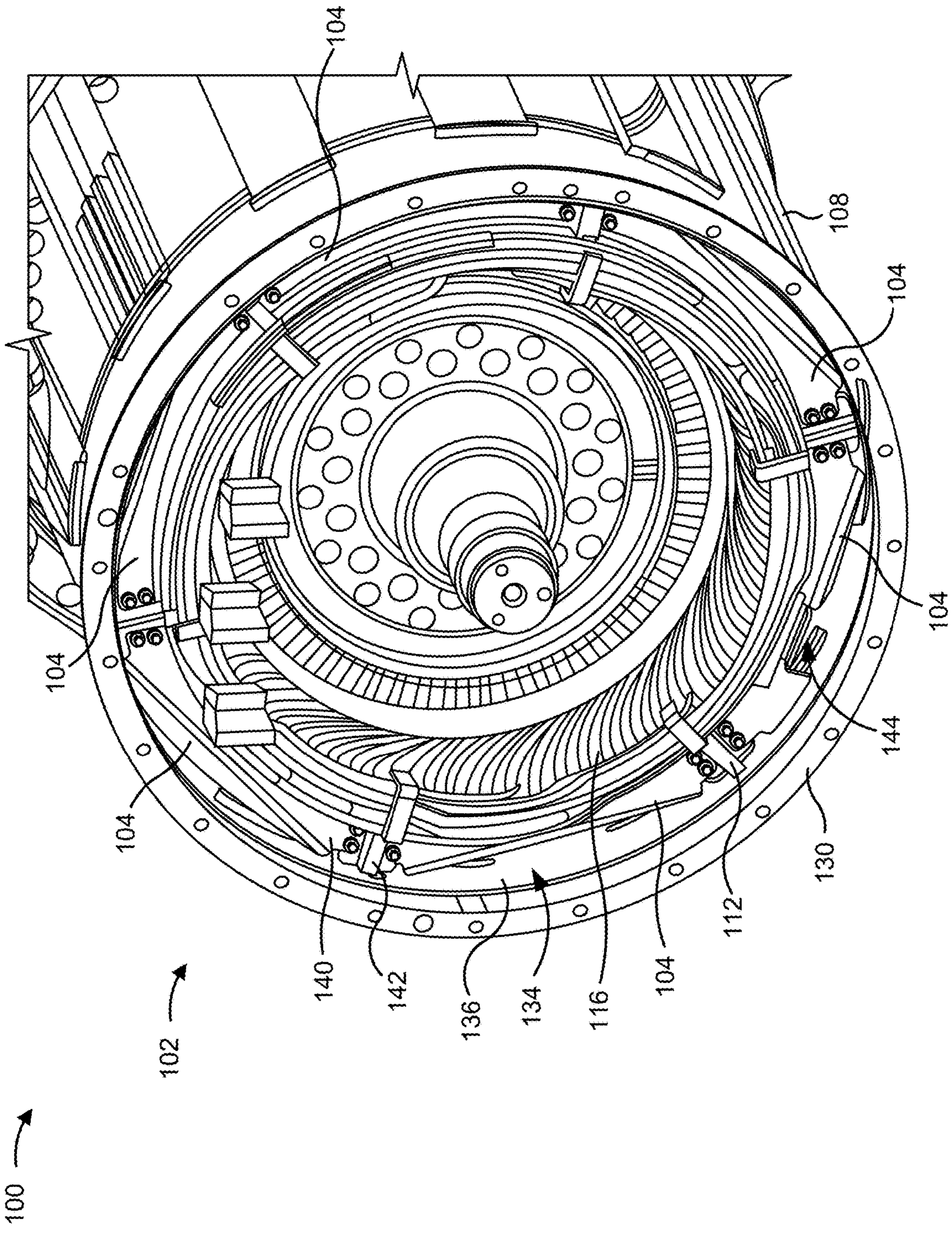
FIG. 3 is a perspective view of the example electric machine.

FIG. 3 is a perspective view of an example electric machine 100. The electric machine 100 depicted in FIG. 3 includes the cooling system 102.

The cooling system 102 includes the one or more baffles 104 configured in the housing 108. The one or more baffles 104 are removably coupled to the stator 112 of the electric machine 100. Additionally, or alternatively, the one or more baffles 104 are removably coupled to the rotor 114. In some examples described herein, the one or more baffles 104 are depicted and/or described as being coupled to the stator 112. However, the one or more baffles 104 may be similarly coupled to the rotor 114, as described herein. For example, each baffle 104 is coupled to the stator 112 or the rotor 114 via a bracket 140. The bracket 140 is removably coupled to the stator 112 via one or more bolts, one or more pin and clip fasteners (e.g., a clevis pin or cotter pin), one or more fasteners, one or more rivets, and/or another type of removable fastening mechanism. For example, the one or more baffles 104 are removably coupled to the stator via respective brackets 140.

The one or more baffles 104 are positioned proximate to the second end 130. The one or more baffles 104 extend away from the one or more windings 116 and toward the first end 128, as depicted and described in more detail elsewhere herein. For example, the one or more baffles 104 extend away from the stator 112 and into the passageway 134. The one or more baffles 104 are configured to direct air flow (e.g., the air flow 118) toward the one or more windings 116 of the electric machine 100 at the second end 130 by extending into the passageway 134.

As shown in FIG. 3, the one or more baffles 104 may extend around a periphery of the inner surface 136 of the housing 108. For example, the one or more baffles 104 extend circumferentially around the interior of the housing 108. As an example, the stator 112 has a cylindrical body 142. The one or more baffles 104 are configured around a circumference of the cylindrical body 142.

The one or more baffles 104 may be multiple baffles 104 spaced around the circumference of the cylindrical body 142 (e.g., as shown in FIG. 3). For example, the multiple baffles 104 are evenly or equally circumferentially spaced in the passageway 134. The cooling system 102 may include a quantity of baffles 104 and/or the baffles 104 may be sized to leave little or no gaps between the baffles 104 in the passageway 134 around a circumference of the passageway 134.

In some examples, the cooling system 102 includes one or more baffles 104 having a passthrough 144 (e.g., as depicted or described in more detail in connection with FIG. 7). Because of the little or no gaps between the baffles 104 in the passageway 134, the passthrough 144 is configured to allow pipes, wires, conduits, and/or other components of the electric machine 100 to pass from the second end 130 to the interior of the electric machine 100.

As indicated above, FIG. 3 is provided as an example. Other examples may differ from what is described with regard to FIG. 3.

Figure 4:
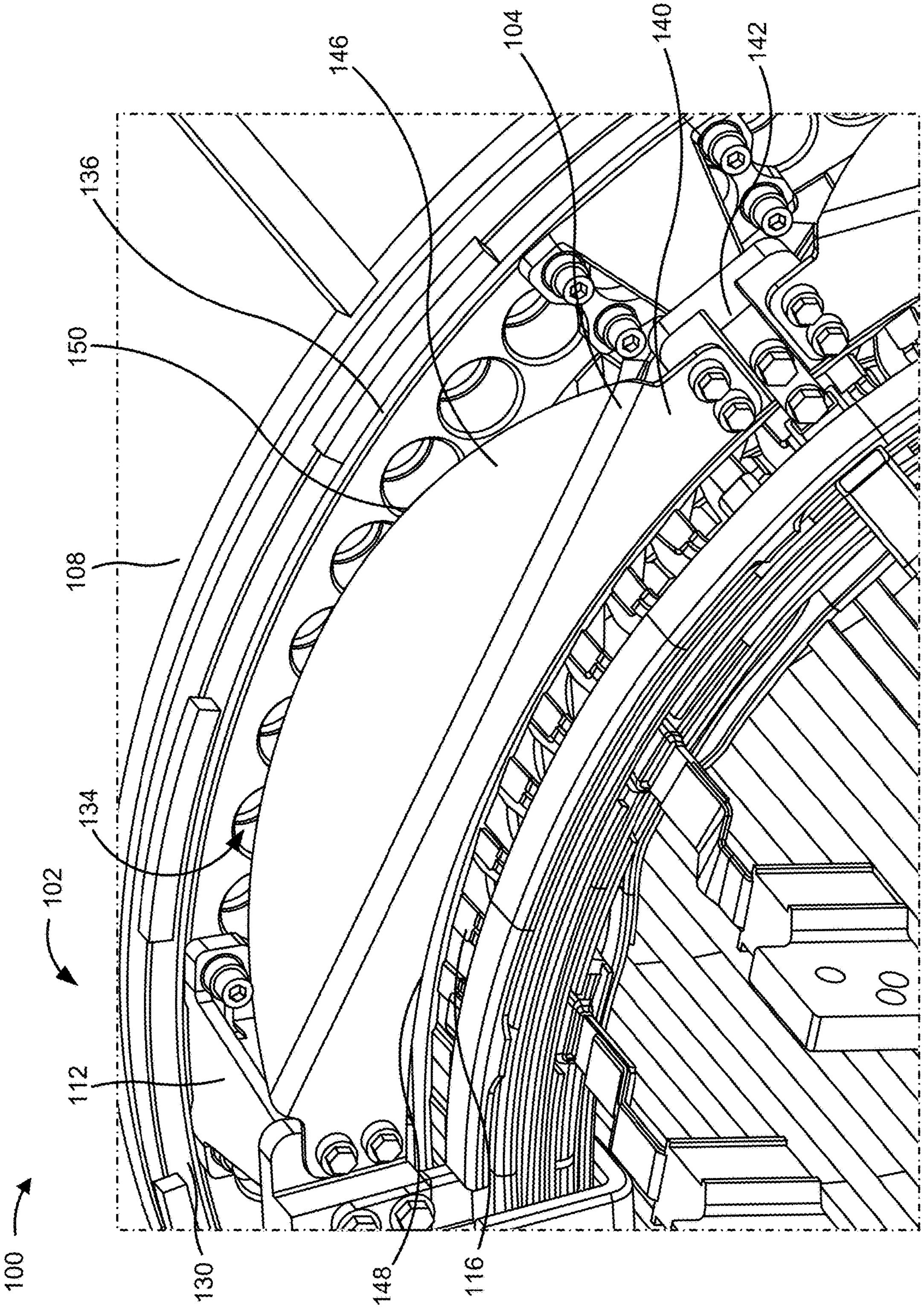
FIG. 4 is a perspective view of the example electric machine.

FIG. 4 is a perspective view of an example electric machine 100. The electric machine 100 depicted in FIG. 4 includes the cooling system 102.

As shown in FIG. 4, a baffle 104 is removably coupled to the stator 112. The baffle 104 includes a bracket 140 and a deflector 146. The bracket 140 is coupled to the stator 112 via one or more removable coupling means. As shown in FIG. 4, the removable coupling means include one or more bolts and nuts. FIG. 4 depicts four bolts and nuts removably securing the baffle 104 to the stator 112. However, any suitable quantity and/or type of removable attachment means may be used to removably couple or secure the baffle 104 to the stator 112. In other examples, the removable coupling means include fasteners, screws, rod and pins, rivets, or other means that enable the baffle 104 to be removed from the stator 112.

The bracket 140 has a geometry corresponding to a geometry of the stator 112. As shown in FIG. 4, the stator 112 has the cylindrical body 142 (or curved body). The bracket 140 may have a similar curvature as the cylindrical body 142 of the stator 112. A radius of a curvature 148 in the bracket 140 is based on a radius of the stator 112 (e.g., of the cylindrical body 142). For example, the radius of the curvature 148 may be the radius of the stator 112 or may be within a tolerance of the radius of the stator 112. In some examples, the radius of the curvature 148 in the bracket 140 is based on a radius of the housing 108. For example, the radius of the curvature 148 may be the radius of the housing 108 or may be within a tolerance of the radius of the housing 108.

The deflector 146 extends from the bracket 140 into the passageway 134. The deflector extends away from the stator 112 and/or the one or more windings 116 and toward the housing 108. The geometry of the deflector 146 is based on the geometry of the housing 108 and/or of the passageway 134. As shown in FIG. 4, the housing 108 has a cylindrical or annular geometry and the deflector 146 is curved to be similar to the cylindrical or annular geometry of the housing 108. For example, a curvature 150 in the deflector 146 is based on the radius of the housing 108 (e.g., on the inner surface 136 of the housing 108). The radius of the curvature 150 may be the radius of the inner surface 136 of the housing 108 or may be within a tolerance of the radius of inner surface 136 of the housing 108. The deflector 146 is configured to deflect or direct air flow (e.g., the air flow 118) in the passageway 134 toward the center of the housing 108 (e.g., toward the one or more windings 116).

As indicated above, FIG. 4 is provided as an example. Other examples may differ from what is described with regard to FIG. 4.

Figure 5:
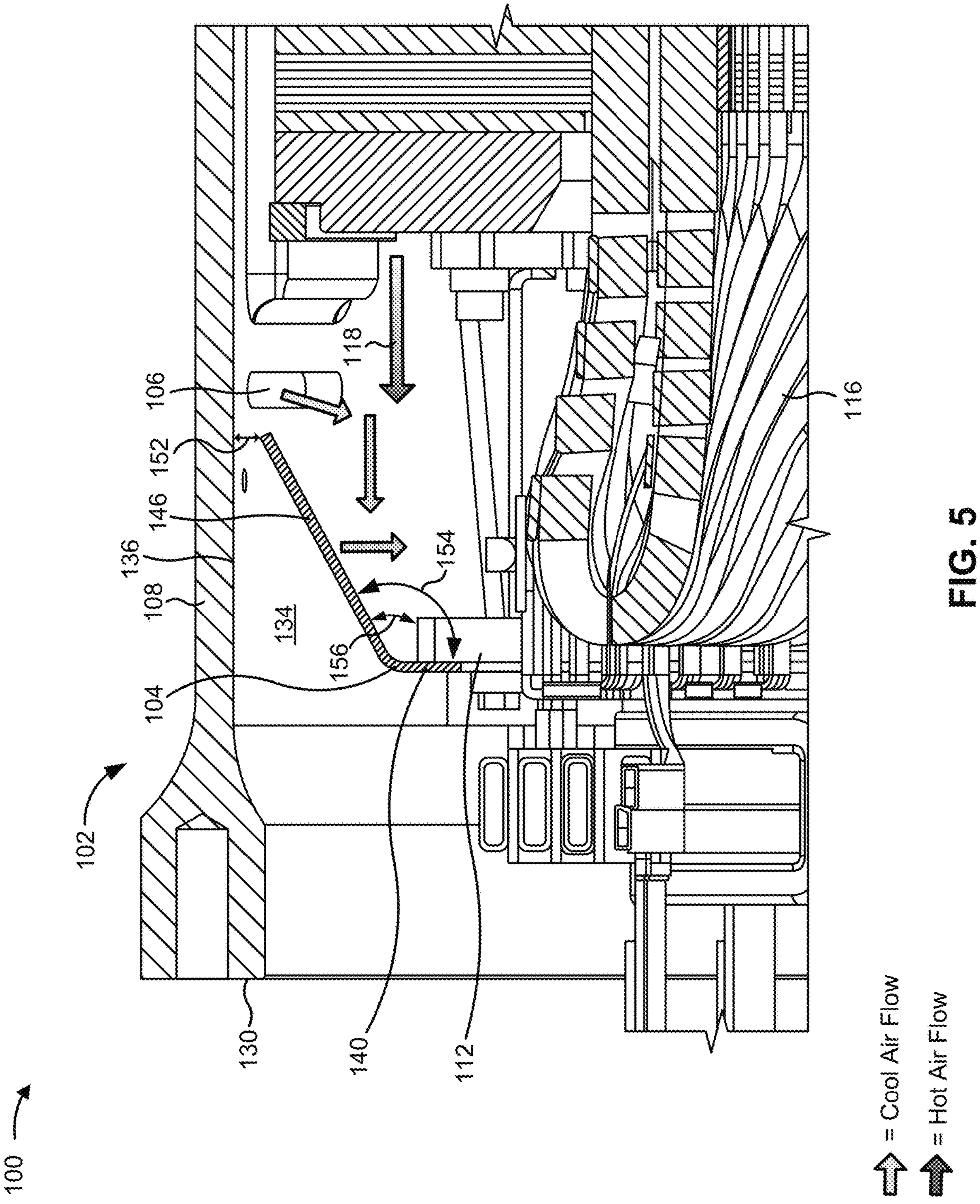
FIG. 5 is a partial cross-section view of the example electric machine.

FIG. 5 is a partial cross-section view of an example electric machine 100. The electric machine 100 depicted in FIG. 5 includes the cooling system 102.

As shown in FIG. 5, the baffle 104 extends between the stator 112 and the inner surface 136 of the housing 108. The baffle 104 extends into the passageway 134. The baffle 104 is configured to deflect or direct the air flow 118 toward the interior of the housing 108 (e.g., toward the one or more windings 116). There is a gap 152 between the baffle 104 and the inner surface 136 of the housing 108. The one or more baffles 104 are configured to result in the gap 152 (e.g., an even gap) around the circumference of the inner surface 136. The gap 152 may be less than or equal to a threshold. For example, the gap 152 may be a small gap to cause a majority of the air flow 118 to be directed or deflected toward the interior of the housing 108 (e.g., toward the one or more windings 116).

The one or more baffles 104 extend toward the first end 128 of the electric machine 100 (not shown in FIG. 5) and away from the second end 130. The one or more baffles 104 are angled toward the first end 128 and away from the second end 130. In other words, the one or more baffles 104 are angled against the direction of flow of the air flow 118. For example, the deflector 146 may be angled with respect to the bracket 140 of the baffle 104. As shown in FIG. 5, there may be an angle 154 between the deflector 146 and the bracket 140. The angle 154 is less than 180 degrees. The angle 154 is less than 180 degrees and greater than 90 degrees.

Similarly, the baffle 104 is angled with respect to the stator 112. For example, the baffle 104 is angled with respect to an outer surface of the stator 112 and/or with respect to an axis of the stator 112. As shown in FIG. 5, there is an angle 156 between the baffle 104 (e.g., the deflector 146) and the stator 112. The angle 156 is less than 90 degrees. In some examples, the angle 156 is less than 90 degrees and greater than 30 degrees. The angle of the baffle(s) 104 increases the amount of air that is directed or deflected by the baffle(s) 104.

The one or more baffles 104 are configured behind the one or more openings 106 relative to the first end 128 of the electric machine 100. As shown in FIG. 5, the baffle 104 is configured in front of the opening 106 relative to the second end 130. This enables cool air to enter the housing via the opening 106. The cool air reduces the temperature of the air flow 118. The cooled air flow 118 (e.g., that is heated as the air flow 118 travels through the housing 108 and/or the passageway 134) is then directed or deflected toward the interior of the housing 108 (e.g., toward the one or more windings 116).

As indicated above, FIG. 5 is provided as an example. Other examples may differ from what is described with regard to FIG. 5.

Figure 6:
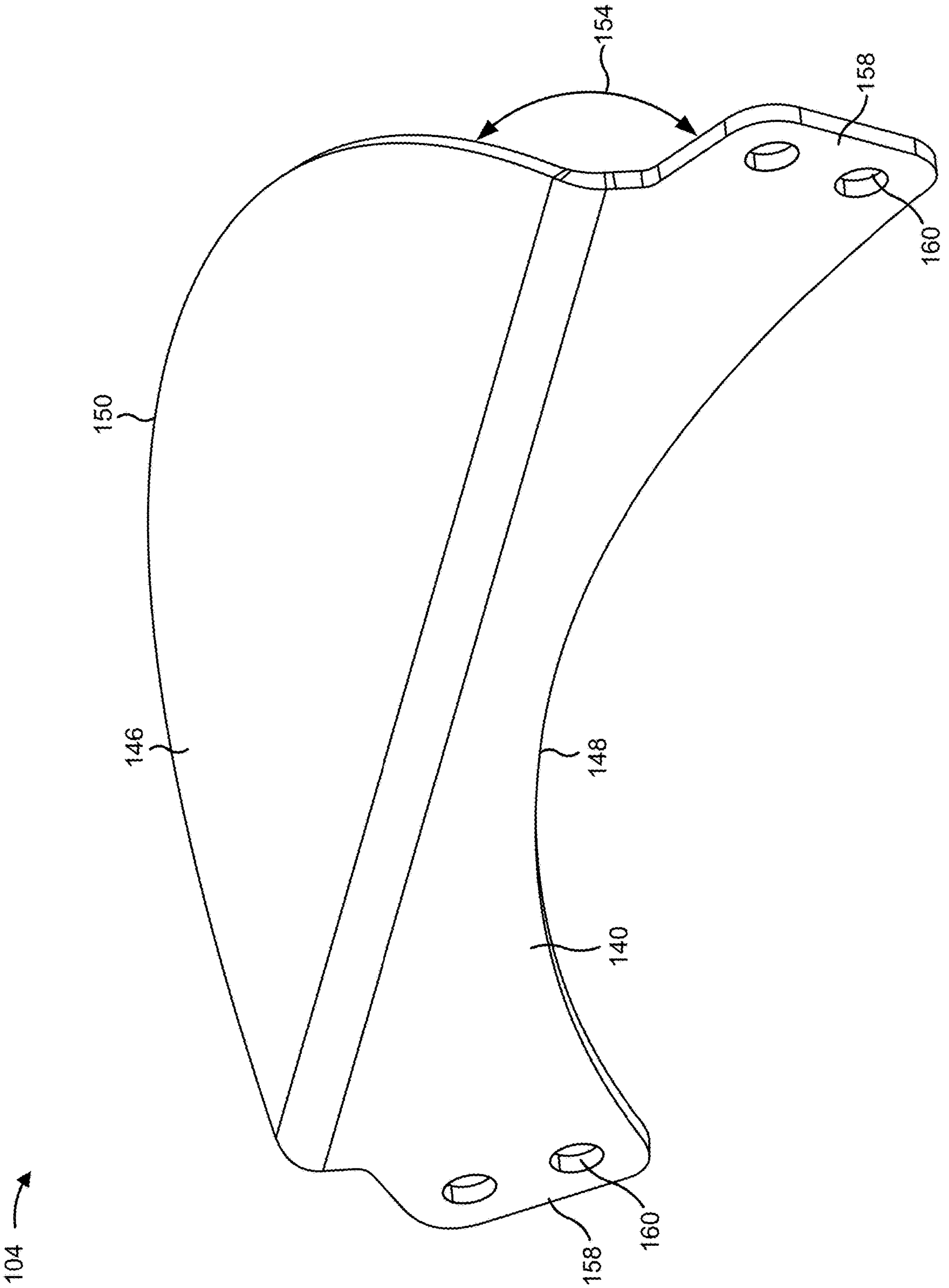
FIG. 6 is a perspective view of an example baffle.

FIG. 6 is a perspective view of an example baffle 104. The baffle 104 depicted in FIG. 6 is included in the cooling system 102 of the electric machine 100.

The baffle 104 includes the bracket 140 and the deflector 146. The bracket 140 and the deflector 146 are a single unitary piece forming the baffle 104. The baffle 104 may be metal, such as sheet metal. In other examples, the baffle 104 is a molded piece made of any suitable material, such as metal, cast iron, aluminum, plastic, and/or a composite material, among other examples.

The bracket 140 includes one or more attachment sections 158. The baffle 104 is configured to be removably coupled to the stator 112 (not shown in FIG. 6) via the one or more attachment sections 158. For example, as shown in FIG. 5, an attachment section 158 includes one or more apertures 160. The one or more apertures 160 are configured to facilitate a removable attachment mechanism, such as a bolt, among other examples.

The baffle 104 includes the angle 154 between the deflector 146 and the bracket 140. The angle 154 is configured to cause the baffle 104 to be angled against the direction of flow of the air flow 118 when the baffle 104 is configured in the electric machine 100 (e.g., as depicted and described elsewhere herein). The baffle 104 includes the curvature 148. The curvature 148 is configured to enable the bracket 140 to match, or be similar, to the geometry of the stator 112 (e.g., to reduce a complexity associated with removably attaching the baffle 104 to the stator 112). The baffle 104 includes the curvature 150. The curvature 150 is configured to match, or be similar to, a geometry of the inner surface 136 of the housing 108 (e.g., as depicted and described elsewhere herein). For example, the curvature 150 is configured to enable the gap 152 between the baffle(s) 104 and the inner surface 136 to be relatively even or equal across the circumference of the inner surface 136.

As indicated above, FIG. 6 is provided as an example. Other examples may differ from what is described with regard to FIG. 6.

Figure 7:
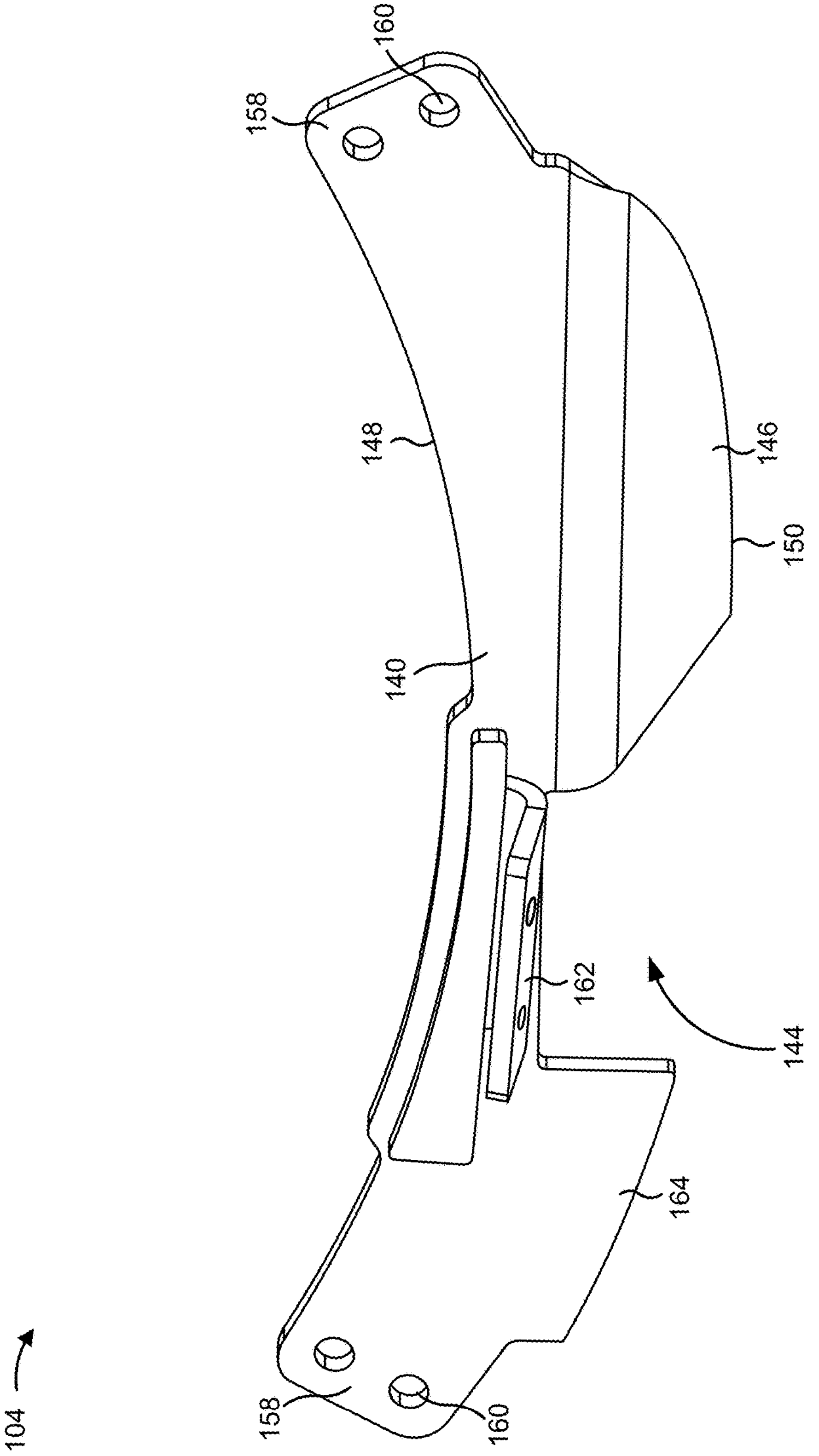
FIG. 7 is a perspective view of an example baffle.

FIG. 7 is a perspective view of an example baffle 104. The baffle 104 depicted in FIG. 7 is included in the cooling system 102 of the electric machine 100.

The baffle 104 depicted in FIG. 7 includes the passthrough 144. The baffle 104 depicted in FIG. 7 may otherwise be similar to the baffle(s) 104 depicted and described elsewhere herein. Because of the little or no gaps between the baffles 104 in the passageway 134, the passthrough 144 is configured to allow pipes, wires, conduits, and/or other components of the electric machine 100 to pass from the second end 130 to the interior of the electric machine 100 (e.g., as depicted and described elsewhere herein).

The passthrough 144 may include a first portion 162 and a second portion 164. The first portion 162 may be angle at approximately 90 degrees from the bracket 140. The first portion 162 may be angled in an opposite direction as the deflector 146. For example, the deflector may be angled toward a first side of the baffle 104 and the first portion 162 may extend from a second side of the baffle 104. The second portion 164 is an extension of the bracket 140. The first portion and the second portion 164 define the passthrough 144.

As indicated above, FIG. 7 is provided as an example. Other examples may differ from what is described with regard to FIG. 7.

INDUSTRIAL APPLICABILITY

During operation, an electric machine may generate heat. The electric machine may include a cooling system that causes fluid flow (e.g., air flow) to pass over components of the electric machine to cool the components, such as the windings. However, as the fluid flow passes through the electric machine, the fluid flow may be heated. As a result, components (e.g., windings) located closer to an outlet of the fluid flow may not be cooled at the same rate as components (e.g., windings) located closer to an inlet of the fluid flow. Such uneven cooling of the components may cause one or more problems. For example, the uneven cooling of windings may result in uneven wearing of the windings (e.g., the windings (or a portion of a winding) that is less cooled may wear faster). Further, uneven cooling can create hotspots within the windings. These hotspots can result in localized overheating, which can cause insulation breakdown and/or reduced winding life. Overheating caused by uneven cooling accelerates the aging of the windings. Premature aging can significantly reduce the expected lifespan of the electric machine, resulting in more frequent maintenance or the need for replacement (e.g., of windings and/or the entire electric machine). Further, the uneven cooling may result in the electric machine producing additional flow to adequately cool the windings and/or other components of the electric machine, thereby consuming power resources associated with producing the additional flow (e.g., via one or more fans or pumps).

The cooling system 102 described herein enables even cooling throughout the electric machine (e.g., the electric machine 100). For example, the cooling system 102 includes one or more baffles 104 removably coupled to a stator 112 of the electric machine 100. The one or more baffles 104 are configured to direct air flow toward one or more windings of the electric machine 100 at a "hot" end of the electric machine. The one or more baffles are angled toward the "cool" end of the electric machine. For example, the one or more baffles are angled into an air flow through the electric machine. The cooling system includes one or more openings 106 in the housing 108 of the electric machine 100 proximate to the "hot" end of the electric machine 100 configured to enable the air flow to pass into or out of the housing 108.

The cooling system 102 enables even or equal cooling over a length of the electric machine 100. As a result, components (e.g., windings 116) of the electric machine 100 are cooled relatively evenly or equally regardless of a location of the components in the electric machine 100 (e.g., regardless of which end of the electric machine 100 the windings 116 are configured in). The relatively even or equal cooling results in more even wearing of the components (e.g., windings 116) of the electric machine 100. As a result, a likelihood that components (e.g., windings 116) at the "hot" end of the electric machine 100 will wear faster than components (e.g., windings 116) at the "cool" end is reduced. Additionally, an amount of air flow needed to adequately cool the electric machine is reduced. This conserves power that would have otherwise been used to generate a stronger air flow to adequately cool the electric machine 100, such as via one or more fans or pumps.

By the one or more baffles being angled toward the "cool" end of the electric machine, the one or more baffles direct more of the air flow toward the interior of the housing 108 (e.g., more direct more air flow toward the winding(s) of the electric machine) as compared to a flat or straight baffle. Additionally, the combination of the one or more openings 106 and the one or more baffles 104 promotes more efficient cooling of the electric machine 100. For example, the one or more openings 106 may enable cool air to enter the housing 108 which cools an air flow that is then directed or deflected by the one or more baffles 104 toward components (e.g., windings 116) of the electric machine 100 (e.g., to cool the components).

What is claimed is:

1. A cooling system for an electric machine, comprising:
an air inlet, in a housing of the electric machine, at a first end of the electric machine to allow ambient air from outside the housing, through the air inlet, along a passageway of the housing, and toward one or more baffles removably coupled, as a unitary structure, to a stator of the electric machine, the one or more baffles being positioned proximate to a second end of the electric machine, and the one or more baffles being configured to direct the ambient air toward one or more windings of the electric machine at the second end; and
one or more openings in the housing of the electric machine proximate to the second end of the electric machine configured to enable the ambient air to pass into or out of the housing.

2. The cooling system of claim 1, wherein the one or more baffles extend toward the first end of the electric machine.

3. The cooling system of claim 1, wherein an angle between each of the one or more baffles and the stator is less than 90 degrees.

4. The cooling system of claim 1, wherein the stator has a cylindrical body, and
wherein the one or more baffles are configured around a circumference of the cylindrical body.

5. The cooling system of claim 1, wherein the one or more baffles extend between the stator and an inner surface of the housing.

6. The cooling system of claim 1, wherein the one or more baffles are configured behind the one or more openings relative to the first end of the electric machine.

7. The cooling system of claim 1, wherein the one or more openings are multiple openings that are spaced around a periphery of the housing.

8. An electric machine, comprising:
a housing including an air inlet;
a stator;
one or more windings configured within the stator, the one or more windings from a first end of the electric machine to a second end of the electric machine, the first end being proximate to the air inlet; and
one or more baffles configured to be removably coupled, as a unitary structure to the stator or to a rotor of the electric machine, wherein each of the one or more baffles includes a first portion, extending along a first plane, and a second portion extending along a second plane different from the first plane, wherein the first portion and the second portion together form a continuous airflow-deflecting surface, and wherein the second portion extends away from the one or more windings and toward the first end.

9. The electric machine of claim 8, wherein the air inlet is configured to provide an air flow into the housing, and
wherein the one or more baffles are configured to direct the air flow toward the one or more windings at the second end.

10. The electric machine of claim 8, wherein the housing further comprises:
one or more openings proximate to the second end.

11. The electric machine of claim 10, wherein the one or more baffles are positioned behind the one or more openings relative to the first end.

12. The electric machine of claim 10, wherein the one or more openings are multiple openings that are equally spaced around a periphery of the housing.

13. The electric machine of claim 8, wherein an angle between the one or more baffles and the stator is less than 90 degrees.

14. A cooling system for an electric machine, comprising:
an air inlet at a first end of the electric machine configured to provide an air flow through a housing of the electric machine; and
one or more baffles, positioned proximate to a second end of the electric machine, comprising:
a bracket, removably coupled directly to a stator of the electric machine, comprising a first end and a second end opposite from the first end, wherein the first end of the bracket has a curvature with a radius that is based on a radius of the housing, and
a deflector extending from the stator and the second end of the bracket, wherein the deflector extends away from the stator at an angle towards the first end that is greater than 90 degrees and less than 180 degrees.

15. The cooling system of claim 14, further comprising: one or more openings in the housing of the electric machine proximate to the second end of the electric machine configured to enable the air flow to pass into or out of the housing.

16. The cooling system of claim 14, wherein the stator has a cylindrical body, and wherein the one or more baffles are configured around a circumference of the cylindrical body.

17. The cooling system of claim 14, wherein the one or more baffles extend between the stator and an inner surface of the housing.

18. The cooling system of claim 14, wherein the housing comprises the air inlet.

19. The cooling system of claim 1, wherein the one or more baffles comprise a bracket, removably coupled directly to the stator of the electric machine, comprising a first end and a second end opposite from the first end, wherein the first end of the bracket has a curvature with a radius that is based on a radius of the housing.

20. The electric machine of claim 8, wherein each of the one or more baffles includes a passthrough extending through the second portion of a respective baffle of the one or more baffles, the passthrough being configured to allow one or more components of the electric machine to pass from the second end toward an interior of the electric machine.

* * * * *